A. AVERY.
TIRE PROTECTOR.
APPLICATION FILED NOV. 25, 1916.

1,256,763. Patented Feb. 19, 1918.

WITNESS

INVENTOR
A. AVERY,
BY
Fred. B. Featherstonhaugh
ATT'YS.

UNITED STATES PATENT OFFICE.

ARNOLD AVERY, OF MALLORYTOWN, ONTARIO, CANADA.

TIRE-PROTECTOR.

1,256,763.

Specification of Letters Patent.

Patented Feb. 19, 1918.

Application filed November 25, 1916. Serial No. 133,442.

*To all whom it may concern:*

Be it known that I, ARNOLD AVERY, a subject of the King of Great Britain, and resident of Mallorytown. in the township of Escott, in the county of Leeds and Province of Ontario, Dominion of Canada, have invented certain new and useful Improvements in Tire-Protectors, and do hereby declare that the following is a full, clear, and exact description of the same, such as will enable those skilled in the art to which it appertains to make and use the same.

This invention relates to improvements in tire protectors and the objects of the invention are to prevent puncturing and blowouts and so give a longer life to the tire, to obviate side slipping and skidding, to permit of the protector being easily assembled and located in position on the tread of the tire, to render worn out shoes being easily removed and replaced, and generally to adapt the protector to better perform the functions required of it, and it consists essentially of the improved construction particularly described and set forth in the following specification and accompanying drawings forming part of the same.

In the drawings.

Like characters of reference refer to like parts in the several figures.

Figure 1:
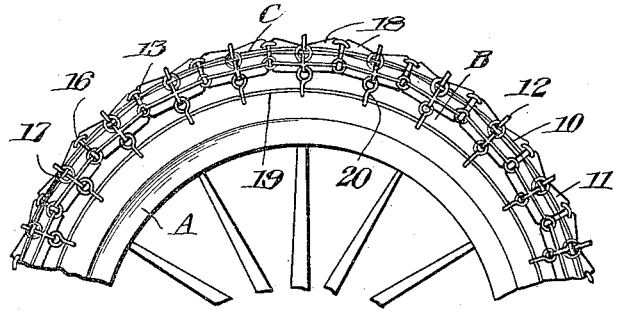
Figure 1 is a fragmentary elevation of an automobile wheel embodying the present invention.
Figure 2:
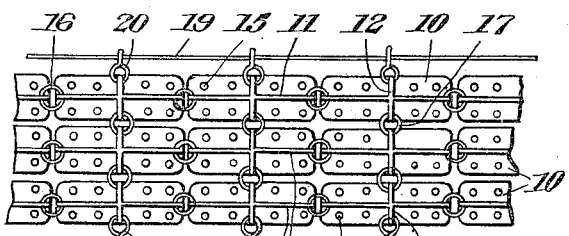
Fig. 2 is a fragmentary plan view of the improved tire protector.
Figure 3:
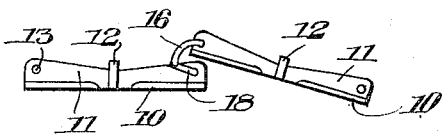
Fig. 3 is a side elevation of the two tread blocks showing the means for connecting the ends of the protector.

Referring to the drawing, A represents an automobile wheel of any usual description provided with tire B on which the protector C is operatively mounted. This protector consists of a plurality of shoes 10 substantially rectangular in shape provided with longitudinally and transversely extending ribs 11 and 12 having orifices 13 and 14 through the ends thereof and provided with a plurality of orifices 15 which allow sand and the like to drain out from between the tread of the tire and the said shoe.

These shoes are connected longitudinally by means of the links 16 which engage with the orifices 13 while they are connected to adjacent side shoes by the links 17 engaging with the orifices 14. A plurality of shoes are arranged in this way, forming a chain, the shoes forming one end of which are provided with a slot 18 adapted to engage the link 16 of the adjacent shoe so facilitating in completing the circular formation of the protector.

The protector is secured in position by rods 19 which extend around the tire adjacent to the lateral faces thereof and are operatively connected to the shoes by the links 20 which engage with the orifices 14, the said rods being secured in any suitable manner.

Figure 4:
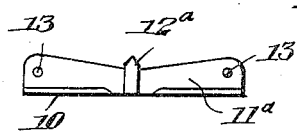
Fig. 4 is a side elevation of and alternative form of tread block adapted for winter use.
Figure 5:
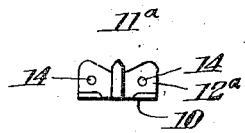
Fig. 5 is an end elevation of the same.

In Figs. 4 and 5 an alternative form of shoe is illustrated in which the longitudinally and transversely extending ribs 11$^a$ and 12$^{aa}$ are formed with a tapered point adapted to bite into the ice bound road.

The assembly of the protector will be readily understood from the foregoing description.

When using the protector it is placed on a deflated tire which when inflated frictionally engages with the inner face of the shoes 10 securely gripping the same and obviating any liability of their becoming inadvertently displaced. Should any sand or the like work between the tread of the tire B and the inner face of the shoes 10 the said sand will drain out through the orifices 15 so that there is no liability of undue wear, due to this cause, taking place between the said tire and shoes.

From the above description it will be seen that I have invented a tire protector which can be easily assembled and positioned on a tire and in which worn out shoes may be removed and replaced with a minimum of labor and time.

As many changes could be made in the above description and many apparently widely different embodiments of my invention, within the scope of the claims, constructed without departing from the spirit or scope thereof, it is intended that all matter contained in the accompanying specification and drawing shall be interpreted as illustrative and not in a limiting sense.

What I claim as my invention is:

1. A tire protector of the class described comprising a plurality of shoes having intersecting longitudinally and transversely extending ribs of a height decreasing toward the point of intersection, flexible means operatively connecting the shoes and means embracing the lateral faces of a tire adapted to secure the shoes in position.

2. A new article of manufacture comprising an apertured shoe having intersecting ribs thereon of a height decreasing toward their point of intersection.

In witness whereof I have hereunto set my hand in the presence of two witnesses.

ARNOLD AVERY.

Witnesses:
　JOHN D. W. DARLING,
　JAMES MOORHEAD.